(12) United States Patent
Chuang et al.

(10) Patent No.: US 10,263,943 B2
(45) Date of Patent: Apr. 16, 2019

(54) AUTOMATIC RELEVANCE-BASED INFORMATION INCLUSION IN ELECTRONIC COMMUNICATION

(71) Applicant: Microsoft Technology Licensing, LLC, Redmond, WA (US)

(72) Inventors: Kevin Chuang, San Francisco, CA (US); Srihari Murali, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 115 days.

(21) Appl. No.: 15/477,266

(22) Filed: Apr. 3, 2017

(65) Prior Publication Data

US 2017/0346780 A1    Nov. 30, 2017

Related U.S. Application Data (60) Provisional application No. 62/342,556, filed on May 27, 2016.

(51) Int. Cl.
| | |
|---|---|
| *G06F 15/16* | (2006.01) |
| *H04L 12/58* | (2006.01) |
| *H04L 29/08* | (2006.01) |
| *G06F 17/30* | (2006.01) |
| *G06Q 50/10* | (2012.01) |

(52) U.S. Cl.
CPC ........ *H04L 51/32* (2013.01); *G06F 17/30867* (2013.01); *G06Q 50/10* (2013.01); *H04L 51/063* (2013.01); *H04L 67/10* (2013.01); *H04L 67/306* (2013.01)

(58) Field of Classification Search
CPC ....... H04L 51/32; H04L 51/063; H04L 67/10; H04L 67/306; G06F 17/30867; G06Q 50/10

See application file for complete search history.

(56) References Cited

U.S. PATENT DOCUMENTS

| | | | | |
|---|---|---|---|---|
| 2010/0223341 | A1* | 9/2010 | Manolescu | G06F 17/30867 709/206 |
| 2013/0332308 | A1* | 12/2013 | Linden | G06O 30/0631 705/26.7 |
| 2014/0067931 | A1* | 3/2014 | Harik | H04L 67/306 709/204 |
| 2015/0188851 | A1* | 7/2015 | Tomkins | H04L 51/00 709/206 |

(Continued)

*Primary Examiner* — Jonathan A Bui
(74) *Attorney, Agent, or Firm* — Schwegman Lundberg & Woessner, P.A.

(57) ABSTRACT

A system and method includes receiving, with a processor, an electronic communication from a user device associated with a sender of the electronic communication, the electronic communication being directed to a recipient member of an online social networking system. An entity is determined with which the sender is associated. Relevance scores of information to the entity and to the recipient are determined by comparing social network data regarding the recipient with the entity. At least some of the information is incorporated to the electronic communication based on the relevance scores of the information. A network interface transmits the electronic communication with the at least some of the information added to a user device associated with the recipient.

20 Claims, 5 Drawing Sheets

(56) References Cited

U.S. PATENT DOCUMENTS

| | | | |
|---|---|---|---|
| 2015/0332416 A1* | 11/2015 | Ben-Yair | G06Q 10/00 705/319 |
| 2015/0356083 A1* | 12/2015 | Gyongyi | G06F 17/3053 707/748 |
| 2015/0379113 A1* | 12/2015 | Wang | G06F 17/30598 707/738 |
| 2016/0260129 A1* | 9/2016 | Fadeev | H04L 67/22 |
| 2016/0275634 A1* | 9/2016 | Singh | G06Q 50/2053 |
| 2017/0099358 A1* | 4/2017 | Perez | G06Q 10/0639 |
| 2018/0158114 A1* | 6/2018 | Twist | G06Q 30/0279 |

* cited by examiner

AUTOMATIC RELEVANCE-BASED INFORMATION INCLUSION IN ELECTRONIC COMMUNICATION

TECHNICAL FIELD

The subject matter disclosed herein generally relates to the automatic inclusion of relevant information in electronic communications.

BACKGROUND

Online social networking systems conventionally include one or more mechanisms for engaging in communication between members and/or users of the social networking systems. Such mechanisms may include systems that provide for relatively rich content and formatting, including subject lines, body sections, and the means to include graphics and signatures. Such mechanisms may function as conventional electronic mail systems and may be utilized effectively both between members who have a prior connection on the social networking system and between members who have no prior or formal connection on the social networking system, such as between a recruiter or promoter of a company or organization and a hiring or business prospect.

BRIEF DESCRIPTION OF THE DRAWINGS

Some embodiments are illustrated by way of example and not limitation in the figures of the accompanying drawings.

DETAILED DESCRIPTION

Example methods and systems are directed to the automatic inclusion of relevant information in electronic communications. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Particularly in circumstances where there is no formal connection between a user of the online social networking system who wants to send an electronic communication to a member of the online social networking system and/or little or no prior communication, the content of an electronic communication from a sender, such as a recruiter, to a recipient member, such as a prospective candidate for a job, may tend to be relatively generic with respect to the prospective candidate. For instance, in circumstances where the recruiter has enough information about the prospective candidate to know that the prospective candidate may be qualified and interested but not enough information to know rich personal or professional details, or where the recruiter is attempting to contact a large number of potential candidates, the recruiter may tend to focus the communication on generalities. The potential candidate may, consequently, tend to engage less with the electronic communication than an electronic communication that includes more relevant information to the potential candidate.

It is a notable and unique feature of online social networking systems that data which is inherently collected about members may be available to personalize electronic communications for the recipient or otherwise determine relevant data for electronic communications which would not otherwise be available in communications outside of the context of the online social networking system. For instance, a conventional email system may provide for electronic communication, but not in an environment with information about the recipient which may allow for the automatic inclusion of information about the sender or an opportunity provided by the sender into an email directed to the recipient. Moreover, communications which operate via physical post do not operate within an online system which includes both the capacity to facilitate communications and access and utilize information about a recipient to automatically include relevant information within the communication.

As such, the online social networking system itself creates a unique environment in which information related to the sender or subject of an electronic communication of relevance to a recipient may automatically be included within the electronic communication without a need for the sender to know or understand the relevance of the information to the recipient. Such an online social networking system may potentially improve both ease of use and efficiency for the sender as well as engagement by the recipient with the communication. These may be achieved while potentially maintaining enhanced privacy for the recipient, as the sender would not necessarily need to know the personal or professional details of the recipient sufficient for the sender to know what would likely be relevant to the recipient.

Figure 1:
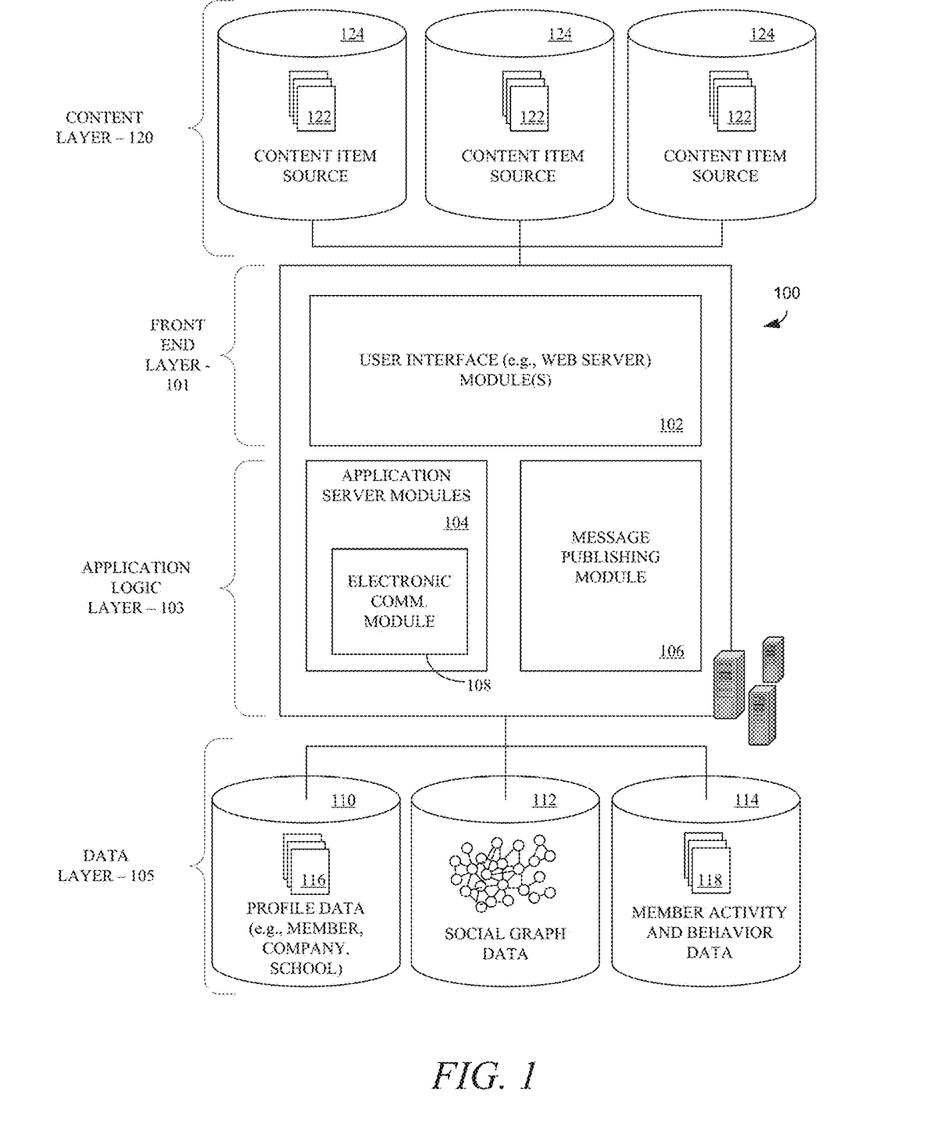
FIG. 1 is a block diagram illustrating various components or functional modules of a social network system, consistent with some examples.

FIG. 1 is a block diagram illustrating various components or functional modules of an online social networking system 100, consistent with some examples. A front end 101 consists of a user interface module (e.g., a web server) 102, which receives requests from various client-computing devices, and communicates appropriate responses to the requesting client devices. For example, the user interface module(s) 102 may receive requests in the form of Hypertext Transport Protocol (HTTP) requests, or other web-based, application programming interface (API) requests. An application logic layer 103 includes various application server modules 104, which, in conjunction with the user interface module(s) 102, may generate various user interfaces (e.g., web pages, applications, etc.) with data retrieved from various data sources in a data layer 105. In some examples, individual application server modules 104 may be used to implement the functionality associated with various services and features of the social network service. For instance, the ability of an organization to establish a presence in the social graph of the social network system 100, including the ability to establish a customized web page on behalf of an organization, and to publish messages or status updates on behalf of an organization, may be services implemented in independent application server modules 104. Similarly, a variety of other applications or services that are made available to members of the social network service may be embodied in their own application server modules 104.

Alternatively, various applications may be embodied in a single application server module 104. In some examples, the social network system 100 includes a content item publishing module 106, such as may be utilized to receive content, such as electronic messages, posts, links, images, videos, and the like, and publish the content to the social network.

One or more of the application server modules 104, the content item publishing module 106, or the social networking system 100 generally may include an electronic communication module 108. As will be disclosed in detail herein, the electronic communication module 108 may allow for electronic communications within the social networking system 100 to automatically incorporate information relevant to the sender, subject, and/or recipient of an electronic communication in the electronic communication.

The electronic communication module 108 may be implemented on a separate server or may be part of a server that provides other portions of the social network system 100. Thus, it is to be understood that while the electronic communication module 108 is described as an integral component of a social networking system, the principles described herein may be applied without the electronic communication module 108 being an integral part of a social networking system provided the member data of an online social networking system is available to the electronic communication module 108.

As illustrated, the data layer 105 includes, but is not necessarily limited to, several databases 110, 112, 114, such as a database 110 for storing profile data 116, including both member profile data as well as profile data for various organizations. Consistent with some examples, when a person initially registers to become a member of the social network service, the person may be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 110. Similarly, when a representative of an organization initially registers the organization with the social network service, the representative may be prompted to provide certain information about the organization. This information may be stored, for example, in the database 110, or another database (not shown). With some examples, the profile data may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or seniority level within a particular company. With some examples, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some examples, a member may elect to "follow" another member. In contrast to establishing a connection, the concept of "following" another member typically is a unilateral operation, and at least with some examples, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph database 112.

The data layer 105 collectively may be considered a content item database, in that content items 120, including but not limited to member profiles 116, may be stored therein. Additionally or alternatively, a content item layer 120 may exist in addition to the data layer 105 or may include the data layer 105. The content item layer 120 may include individual content items 122 stored on individual content item sources 124. The member profiles 116 and the activities 118 may be understood to be content items 122, while the profile database 110, the social graph database 112, and the member activity database 114 may also be understood to be content item sources 124. Content items 122 may further include sponsored content items as well as posts to a news feed, articles or links to websites, images, sounds, event notifications and reminders, recommendations to users of the social network for jobs or entities to follow within the social network, and so forth.

The social network service may provide a broad range of other applications and services that allow members the opportunity to share and receive information, often customized to the interests of the member. For example, with some examples, the social network service may include a photo sharing application that allows members to upload and share photos with other members. With some examples, members may be able to self-organize into groups, or interest groups, organized around a subject matter or topic of interest. With some examples, the social network service may host various job listings providing details of job openings with various organizations.

Although not shown, with some examples, the social network system 100 provides an application programming interface (API) module via which third-party applications can access various services and data provided by the social network service. For example, using an API, a third-party application may provide a user interface and logic that enables an authorized representative of an organization to publish messages from a third-party application to various content streams maintained by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
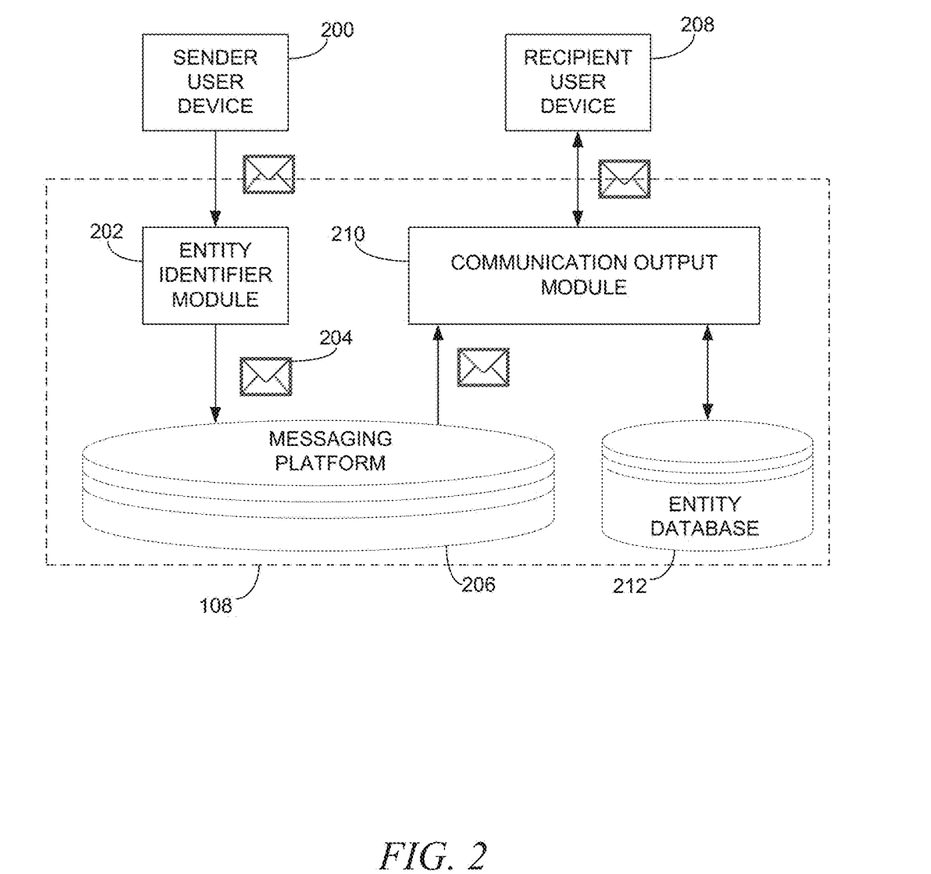
FIG. 2 is a block diagram of details of portions of a social networking system, including an electronic communication module, and user devices which may couple to the system, in an example embodiment.

FIG. 2 is a block diagram of details of portions of the social networking system 100, including the electronic communication module 108, and user devices which may couple to the system 100, in an example embodiment. A sender user device 200 associated with an account of a sender of an electronic communication, such as a recruiter or any other person or, more generally, entity that may engage in electronic communication, may couple to the electronic communication module 108 via the user interface module 102.

The electronic communication module 108 includes a sender frontend module, such as an entity identifier module 202, configured to identify an entity associated with the account of the sender. For instance, the account may be a single contractor account associated with a known entity, such as from a domain of or associated with a known company or organization. Additionally or alternatively, the entity identifier module 202 may utilize one or more keyword searches to identify known entities, e.g., by noting the presence of a known company or organization name in the electronic communication, or by the sender including a particular entity as the entity in the electronic communication, e.g., by entering an entity name in a dedicated field in the electronic communication, among other potential entity identification mechanisms. The entity identifier module 202 may append an entity ID associated with the entity as identified onto an electronic communication 204 transmitted from the sender user device 200.

A messaging platform 206 then receives the electronic communication 204 and configures the electronic communication 204 into a format for transmission to a recipient user device 208. For instance, the messaging platform 206 may receive the electronic communication 204 as text and/or images in a first format and reconfigure the text and/or images into a second format consistent with the ultimate format of the electronic communication 204 for transmittal to a recipient. Additionally or alternatively, whether or not the format is to be changed, the text, images, or other content in the electronic communication 204 may be changed in appearance and/or layout to accommodate the ultimate form of the electronic communication 204.

The electronic communication 204 then proceeds to a communication output module 210. The communication output module 210 may be an API configured to manage the addition of further information to the electronic communication 204. For instance, the communication output module 210 may identify, based on a tag or other identifier in the electronic communication 204, a conversation or series of related messages of which the electronic communication 204 is a part, e.g., because the electronic communication is a "reply" or "forward" of a previously transmitted electronic communication 204. Further, the communication output module 210 may incorporate relevant information to the electronic communication 204, as disclosed herein.

The communication output module 210 may access an entity database 212 for information, graphics, and/or other material or decorations to add to the electronic communication, as disclosed herein. The entity database 212 may be or may be considered two separate databases: a database for first information about and relevant to the entity and a database for second information pertaining to how the entity relates to the message recipient, e.g., information relevant and/or insightful to both the entity and the recipient. Direct information about the entity may include, without limitation, information such as a company logo, statistics about the company such as products, revenue, employees, locations, and the like, or other factual information that is true for the entity generally. Information which relates to the recipient may include, for instance, a connection of the recipient who works at the entity, a number of connections the recipient has who work at the entity, have worked at the entity, or who are otherwise affiliated with the entity (e.g., alumni of a school), a number of connections the entity has who have recently joined or left the entity, a number of connections who are following or otherwise engaging with the entity, and the like. Stated differently, such information has a nexus both with the entity and the recipient. The relevance of the additional information may thus relate to the entity on whose behalf the electronic communication was sent, to the recipient, or to both.

The relevance of information may depend on whether the information is first information relevant to the entity or second information relevant both to the entity and to the recipient. For instance, first information, such as a logo, may be automatically relevant simply by virtue of being a logo of the entity. First information may, by definition, only be relevant to the identity or status of the entity without regard to the recipient. The relevance of the first information may be based on assigned relevance scores based on the nature of the information itself, e.g., a logo may have an automatic relevance score of one hundred (100) while a location of offices of the entity may have an automatic relevance score of ten (10), and/or based on a tendency of the recipient and/or other members of the online social networking system 100 to interact with electronic communications 204 having the particular first information.

For instance, if, according to data in the activity database 114, the recipient has in the past interacted with electronic communications 204 that include office location information at a fifty (50) percent greater rate than electronic communications 204 that do not include office locations then the automatic relevance score may be multiplied by 1.5 to arrive at a relevance score of fifteen (15). It is to be readily understood that additional factors and/or algorithms may be incorporated in the determination of the relevance scores of the first information. It is to be noted and understood that although prior tendency to interact with the first information by the recipient or other members of the online social networking system 100 may be utilized in determining the relevance scores of the first information, the first information itself is still related to the entity and not the recipient, with the relevance score potentially being adjusted based on a prior tendency of the recipient or other members to interact with such first information.

By contrast, second information may be relevant based on social networking system 100 data as described herein related to both the entity and the recipient member. For instance, relevance of a single common connection between the entity and recipient may be determined based on a strength of connection between the recipient and the common connection, e.g., based on a number of shared connections between the recipient and the common connection, an identified relationship (e.g., a familial relation may be of greater relevance than a former coworker relationship), common profile data, and the like. Each such factor may be given a relative numerical value and combined to determine an overall relevance score. The relevance scores for various common connections may be determined and a highest relevance score utilized to identify a single most relevant common connection. The principles described with respect to a common connection may be utilized to determine any of a variety of relevance scores for any of a variety of information relevant to both the entity and the recipient.

Thus, in an example, the relevance score for a particular common connection between the entity and the recipient, e.g., an employee at the entity who is a connection of the recipient, may be calculated by adding and/or multiplying various factors. For common connection John Doe, for each member of the online social networking system 100 who is a common connection between John Doe and the recipient, the relevance score may be incremented by one (1). If John Doe is the brother of the recipient then ten (10) may be added to the relevance score, among a variety of other relationship relevance scores. For each profile data 116 in common between John Doe and the recipient, the relevance score may be incremented by one (1).

The relevance score for the John Doe common connection may be multiplied by various factors to account for ongoing activity between John Doe and the recipient as noted in the activity database 114. Thus, if John Doe and/or the recipient interact with content items posted to the online social networking system 100 on average once pre week then John Doe and the recipient may be deemed to have a relatively active connection on the online social networking system 100 and the sum of the individual relevance scores may be multiplied by 1.5 to arrive at the relevance score. By contrast, if John Doe and the recipient have never interacted with content items posted by the other, or do so only very infrequently, e.g., once per quarter or less frequently, then the sum of the individual relevance scores may be multiplied by 0.5 to arrive at the relevance score. For the determination of the relevance scores herein, it is to be recognized and understood that the individual scores and factors are for illustrative purposes and that the scores may be adjusted or omitted altogether based on any of a variety of factors, including the nature of the online social networking system 100 and the priorities of the administrators of the online social networking system 100.

The first and second information may be included in the electronic communication according to their respective relevance scores, with the information having the highest relevance scores included in the electronic communication 204. In one example, the information may be utilized according to a predetermined template which is applicable among multiple recipients, e.g., the information automatically utilizes an entity logo, an entity location, and a number of common connections. In such an example, the template may allow for pieces of information to be categorized and the pieces of information with the highest relevance scores within a category utilized. Thus, for instance, in a category showing common connections, two common connections having the highest individual relevance scores may be named specifically while the remaining common connections are presented as a number (e.g., "John Doe, Jane Roe, and 9 other people you know work at [the entity].")

Alternatively, the information may be tailored to a given recipient according to any of a variety of factors, including the relevance scores, A-B testing and the like. In such an example, the electronic communication 204 may simply include the pieces of information that have the highest individual relevance scores. A-B testing override determined relevance scores to insert specific information or may provide modifiers to the relevance scores to encourage or discourage certain specific pieces of information.

In an example, each electronic communication 204 includes the following metadata information: a unique identification of the electronic communication; an identification of an associated conversation; an electronic communication type; a status; an action type; an identification of the sender; a second communication type of the sender (e.g., a telephone number); a recruiter identification flag; and an entity identification. The electronic communication 204 may include: the unique identification; electronic communication content (e.g. body text and images); relevant information text; relevant information type; relevant information priority; a logo and/or URL link to a logo; and one or more pieces of relevant information and/or a URL associated with the relevant information.

Figure 3:
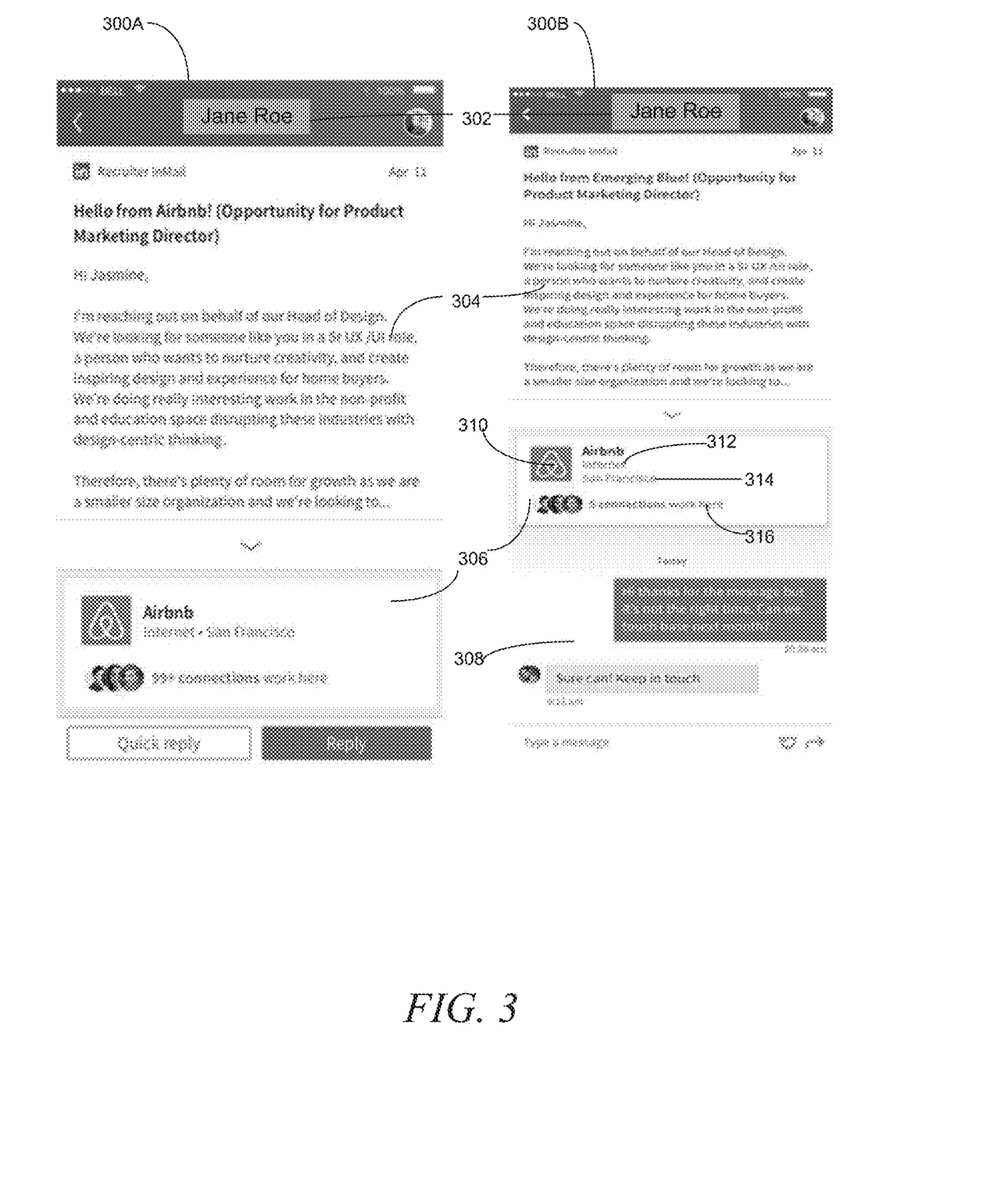
FIG. 3 is a depiction of electronic communications, in an example embodiment.

FIG. 3 is graphic depictions 300A, 300B of electronic communications 204, in an example embodiment. The depictions 300A, 300B each include a sender 302, a body field 304, and a relevant information field 306. The depiction 300B further includes a conversation field 308 including additional related electronic communications 204 from either before or following the time of the electronic communication 204 of the depiction 300B. The body field 304 may be drafted by the sender 302 and may constitute all or effectively all of the sender's contribution to the electronic communication 204. The identification of the sender field 302 and the relevant information field 306 may be added to the electronic communication 204 by the electronic communication module 108, as disclosed herein.

The relevant information field 306 as illustrated includes first information which pertains to the entity as identified, including a logo 310 of the entity, a field of the entity 312, and a location of the entity 314. The relevant information field 306 further includes second information relevant to both the entity and the recipient, including a number of common connections 316 between the entity and the recipient. It is noted that, as illustrated, the number of common connections 316 is based on a number of common connections who also work at the entity, though it is emphasized that the number of common connection may be based simply on a number of common connections without further requirements, or may have further requirements (e.g., common connections who work at the entity and who live in a particular location).

The various components of the relevant information fields 306 may include hyperlinks and/or other options to allow the recipient to access the information, contact an individual, or otherwise interact with the electronic communication 204. Interaction with the electronic communication 204 may take the form of replying to the sender via another electronic communication 204 or by selecting a hyperlink or button to, e.g., view a webpage, initiate communication with a common connection via the online social networking system 100, and the like. As noted herein, interaction with the electronic communication 204 may factor in to the determination of relevance scores for future electronic communications 204. The online social networking system 100 may log such interactions in the activity database 114.

Figure 4:
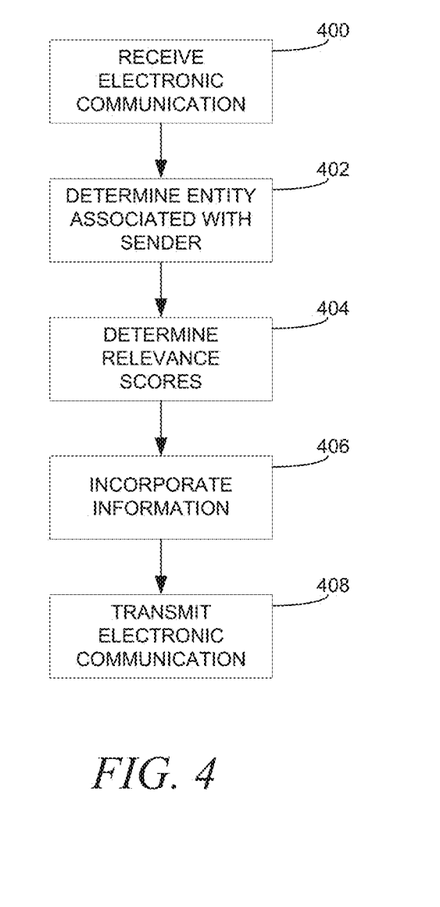
FIG. 4 is a flowchart for automatically adding online social networking information related to the sender or subject of an electronic communication of relevance to a recipient within the electronic communication, in an example embodiment.

FIG. 4 is a flowchart for automatically adding online social networking information related to the sender or subject of an electronic communication of relevance to a recipient within the electronic communication, in an example embodiment. The flowchart may be implemented by the system 100 or any suitable system or device.

At 400, an electronic communication from a user device associated with a sender of the electronic communication is received via a processor of a social networking system, the electronic communication being directed to a recipient member of the online social networking system.

At 402, an entity with which the sender is associated is determined with the processor. In an example, determining the entity is based on at least one of: information of the social networking system indicating an exclusive relationship between the sender and the entity; and a keyword associated with the entity included in the electronic communication.

At 404, relevance scores of information to the entity and to the recipient are determined with the processor, by comparing social network data regarding the recipient with the entity. In an example, the information comprises first information and second information. In an example, determining the relevance scores comprises determining a first relevance score of the first information to the entity and determining a second relevance score of the second information to the entity and to the recipient. In an example, the social network data is social graph data, and wherein determining the second relevance score is based on common social graph connections between the recipient and the entity. In an example, the second relevance score is based on at least one of: a strength of a connection with the recipient of with one of the common social graph connections; and a number of common connections between the recipient and the entity. In an example, the first information is at least one of: a logo of the entity; and statistical information about the entity.

At 406, at least some of the information is incorporated into the electronic communication based on the relevance scores of the information.

At 408, a network interface is caused, with the processor, to transmit the electronic communication with the at least some of the information added to a user device associated with the recipient. In an example, causing the network interface to transmit the electronic communication comprises formatting the electronic communication with a body field for content provided by the sender and an information field for the information added by the processor.

System

Figure 5:
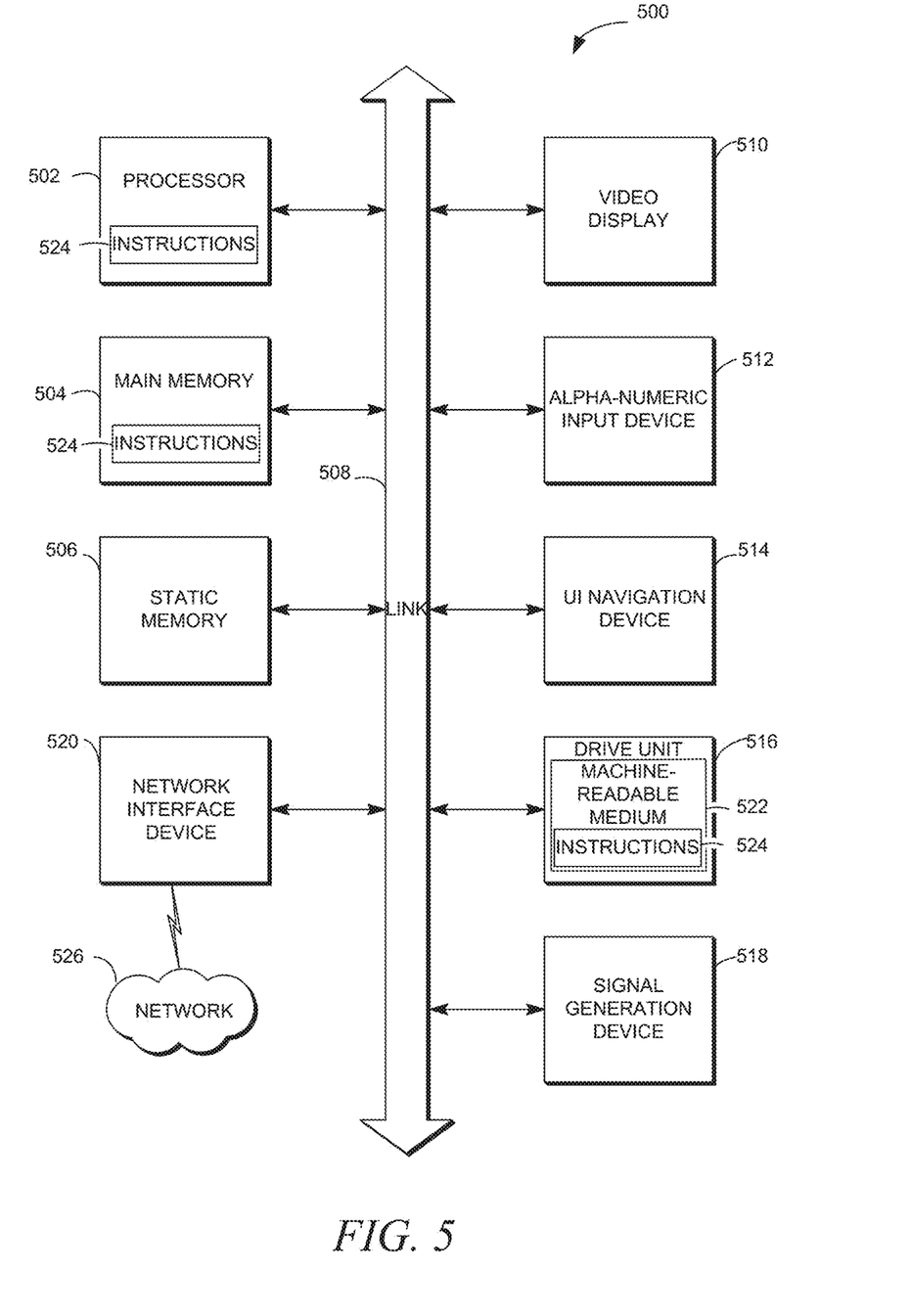
FIG. 5 is a block diagram illustrating components of a machine, according to some example embodiments.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, the machine 500 may implement the social network system 100 and the features included and described therein. The machine 500 thus describes specific hardware configurations on which the social network system 100 may be implemented and provided to users of the social network system 100.

FIG. 5 shows a diagrammatic representation of the machine 500 in the example form of a computer system and within which instructions 524 (e.g., software) for causing the machine 500 to perform any one or more of the methodologies discussed herein may be executed. In alternative embodiments, the machine 500 operates as a standalone device or may be connected (e.g., networked) to other machines. In a networked deployment, the machine 500 may operate in the capacity of a server machine or a client machine in a server-client network environment, or as a peer machine in a peer-to-peer (or distributed) network environment. The machine 500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 524, sequentially or otherwise, that specify actions to be taken by that machine. Further, while only a single machine is illustrated, the term "machine" shall also be taken to include a collection of machines that individually or jointly execute the instructions 524 to perform any one or more of the methodologies discussed herein.

The machine 500 includes a processor 502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The machine 500 may further include a graphics display 510 (e.g., a plasma display panel (PDP), a light emitting diode (LED) display, a liquid crystal display (LCD), a projector, or a cathode ray tube (CRT)). The machine 500 may also include an alphanumeric input device 512 (e.g., a keyboard), a cursor control device 514 (e.g., a mouse, a touchpad, a trackball, a joystick, a motion sensor, or other pointing instrument), a storage unit 516, a signal generation device 518 (e.g., a speaker), and a network interface device 520.

The storage unit 516 includes a machine-readable medium 522 on which is stored the instructions 524 (e.g., software) embodying any one or more of the methodologies or functions described herein. The instructions 524 may also reside, completely or at least partially, within the main memory 504, within the processor 502 (e.g., within the processor's cache memory), or both, during execution thereof by the machine 500. Accordingly, the main memory 504 and the processor 502 may be considered as machine-readable media. The instructions 524 may be transmitted or received over a network 526 via the network interface device 520.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 522 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 500), such that the instructions, when executed by one or more processors of the machine (e.g., processor 502), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method, comprising:
receiving, via a processor of an online social networking system, an electronic communication from a user device associated with a sender of the electronic communication, the electronic communication being directed to a recipient member of the online social networking system;
determining, with the processor, an entity with which the sender is associated;
determining, with the processor, relevance scores of information to the entity and to the recipient by comparing social network data regarding the recipient with the entity;
incorporating, with the processor, at least some of the information to the electronic communication based on the relevance scores of the information; and
causing, with the processor, a network interface to transmit the electronic communication with the at least some of the information added to a user device associated with the recipient.

2. The method of claim 1, wherein the information comprises first information and second information, wherein determining the relevance scores comprises:
determining a first relevance score of the first information to the entity; and
determining a second relevance score of the second information to the entity and to the recipient.

3. The method of claim 2, wherein the social network data is social graph data, and wherein determining the second relevance score is based on common social graph connections between the recipient and the entity.

4. The method of claim 3, wherein the second relevance score is based on at least one of: a strength of a connection with the recipient of with one of the common social graph connections; and a number of common connections between the recipient and the entity.

5. The method of claim 2, wherein the first information is at least one of: a logo of the entity; and statistical information about the entity.

6. The method of claim 1, wherein determining the entity is based on at least one of: information of the online social networking system indicating an exclusive relationship between the sender and the entity; and a keyword associated with the entity included in the electronic communication.

7. The method of claim 1, wherein causing the network interface to transmit the electronic communication comprises formatting the electronic communication with a body field for content provided by the sender and an information field for the information added by the processor.

8. A non-transitory computer readable medium, comprising instructions which, when implemented by a processor, cause the processor to perform operations comprising:
receiving an electronic communication from a user device associated with a sender of the electronic communication, the electronic communication being directed to a recipient member of an online social networking system;
determining an entity with which the sender is associated;
determining relevance scores of information to the entity and to the recipient by comparing social network data regarding the recipient with the entity;
incorporating at least some of the information to the electronic communication based on the relevance scores of the information; and
causing a network interface to transmit the electronic communication with the at least some of the information added to a user device associated with the recipient.

9. The non-transitory computer readable medium of claim 8, wherein the information comprises first information and second information, wherein determining the relevance scores comprises:
determining a first relevance score of the first information to the entity; and
determining a second relevance score of the second information to the entity and to the recipient.

10. The non-transitory computer readable medium of claim 9, wherein the social network data is social graph data, and wherein determining the second relevance score is based on common social graph connections between the recipient and the entity.

11. The non-transitory computer readable medium of claim 10, wherein the second relevance score is based on at least one of: a strength of a connection with the recipient of with one of the common social graph connections; and a number of common connections between the recipient and the entity.

12. The non-transitory computer readable medium of claim 9, wherein the first information is at least one of: a logo of the entity; and statistical information about the entity.

13. The non-transitory computer readable medium of claim 8, wherein determining the entity is based on at least one of: information of the online social networking system indicating an exclusive relationship between the sender and the entity; and a keyword associated with the entity included in the electronic communication.

14. The non-transitory computer readable medium of claim 8, wherein causing the network interface to transmit the electronic communication comprises formatting the electronic communication with a body field for content provided by the sender and an information field for the information added by the processor.

15. A system, comprising:
a non-transitory computer readable medium, comprising instructions which, when implemented by a processor, cause the processor to perform operations comprising:
receiving an electronic communication from a user device associated with a sender of the electronic communication, the electronic communication being directed to a recipient member of an online social networking system;
determining an entity with which the sender is associated;
determining relevance scores of information to the entity and to the recipient by comparing social network data regarding the recipient with the entity;
incorporating at least some of the information to the electronic communication based on the relevance scores of the information; and
causing a network interface to transmit the electronic communication with the at least some of the information added to a user device associated with the recipient.

16. The system of claim 15, wherein the information comprises first information and second information, wherein determining the relevance scores comprises:

determining a first relevance score of the first information to the entity; and determining a second relevance score of the second information to the entity and to the recipient.

17. The system of claim 16, wherein the social network data is social graph data, and wherein determining the second relevance score is based on common social graph connections between the recipient and the entity.

18. The system of claim 17, wherein the second relevance score is based on at least one of: a strength of a connection with the recipient of with one of the common social graph connections; and a number of common connections between the recipient and the entity.

19. The system of claim 16, wherein the first information is at least one of: a logo of the entity; and statistical information about the entity.

20. The system of claim 15, wherein causing the network interface to transmit the electronic communication comprises formatting the electronic communication with a body field for content provided by the sender and an information field for the information added by the processor.

* * * * *

UNITED STATES PATENT AND TRADEMARK OFFICE
CERTIFICATE OF CORRECTION

PATENT NO. : 10,263,943 B2  
APPLICATION NO. : 15/477266  
DATED : April 16, 2019  
INVENTOR(S) : Chuang et al.

Page 1 of 1

It is certified that error appears in the above-identified patent and that said Letters Patent is hereby corrected as shown below:

In the Claims

In Column 13, Line 39, in Claim 4, after "of:", insert --¶--

In Column 13, Line 41, in Claim 4, after "and", insert --¶--

In Column 13, Line 47, in Claim 6, after "of:", insert --¶--

In Column 13, Line 49, in Claim 6, after "and", insert --¶--

In Column 14, Line 24, in Claim 11, after "of:", insert --¶--

In Column 14, Line 25, in Claim 11, after "and", insert --¶--

In Column 14, Line 29, in Claim 12, after "of:", insert --¶--

In Column 14, Line 30, in Claim 12, after "and", insert --¶--

In Column 14, Line 34, in Claim 13, after "of:", insert --¶--

In Column 14, Line 36, in Claim 13, after "and", insert --¶--

In Column 15, Line 10, in Claim 18, after "of:", insert --¶--

In Column 15, Line 12, in Claim 18, after "and", insert --¶--

In Column 15, Line 15, in Claim 19, after "of:", insert --¶--

In Column 15, Line 15, in Claim 19, after "and", insert --¶--

Signed and Sealed this  
Seventeenth Day of March, 2020

Andrei Iancu  
*Director of the United States Patent and Trademark Office*